US012066296B2

United States Patent
Ramesh et al.

(10) Patent No.: US 12,066,296 B2
(45) Date of Patent: Aug. 20, 2024

(54) SYSTEM AND METHOD FOR CLOUD COMPUTING-BASED VEHICLE CONFIGURATION

(71) Applicant: PACCAR Inc, Bellevue, WA (US)

(72) Inventors: Varun Ramesh, Bellingham, WA (US); Shreyash Ukidave, Burlington, WA (US); Michael Douglas Gerty, Bellingham, WA (US)

(73) Assignee: PACCAR Inc., Bellevue, WA (US)

( * ) Notice: Subject to any disclaimer, the term of this patent is extended or adjusted under 35 U.S.C. 154(b) by 447 days.

(21) Appl. No.: 17/239,015

(22) Filed: Apr. 23, 2021

(65) Prior Publication Data

US 2021/0333119 A1 Oct. 28, 2021

Related U.S. Application Data

(60) Provisional application No. 63/015,547, filed on Apr. 25, 2020.

(51) Int. Cl.
*G01C 21/34* (2006.01)
*B60W 50/06* (2006.01)
*G06N 5/04* (2023.01)
*G06N 20/00* (2019.01)

(52) U.S. Cl.
CPC ......... *G01C 21/3484* (2013.01); *B60W 50/06* (2013.01); *G06N 5/04* (2013.01); *G06N 20/00* (2019.01)

(58) Field of Classification Search
CPC .................................................. G01C 21/3484
See application file for complete search history.

(56) References Cited

U.S. PATENT DOCUMENTS

| | | | | |
|---|---|---|---|---|
| 8,548,777 | B2 * | 10/2013 | Sturrock | G06N 20/10 703/22 |
| 11,525,382 | B2 * | 12/2022 | Boyer | F01N 11/00 |
| 2015/0073933 | A1 * | 3/2015 | Stieg | G06Q 30/0631 705/26.7 |
| 2015/0248641 | A1 * | 9/2015 | Bastide | G06Q 10/10 705/328 |
| 2018/0158145 | A1 * | 6/2018 | Weigel | G06Q 40/06 |
| 2019/0160942 | A1 * | 5/2019 | Hergart | G06Q 30/0641 |
| 2020/0150687 | A1 * | 5/2020 | Halder | G05D 1/0291 |
| 2021/0333119 | A1 * | 10/2021 | Ramesh | B60W 50/06 |
| 2021/0333171 | A1 * | 10/2021 | Ramesh | G06Q 30/0631 |
| 2021/0334727 | A1 * | 10/2021 | Ramesh | G06Q 30/0631 |

FOREIGN PATENT DOCUMENTS

EP 3496023 A1 6/2019

OTHER PUBLICATIONS

European Extended Search Report in Application 21170537.1, mailed Sep. 28, 2021, 10 pages.

* cited by examiner

*Primary Examiner* — Michael A Berns
(74) *Attorney, Agent, or Firm* — Merchant & Gould P.C.

(57) ABSTRACT

Aspects are described herein that are capable of providing a vehicle configuration for a vehicle that is optimized to maximize the customer's performance priorities while additionally complying with regulatory emissions requirements and equipment regulations. A machine learning (ML) predictive model is trained based on simulations run on combinations of vehicle configurations and routes and on real-world telematics data, and used to determine a vehicle configuration optimized for a representative route.

17 Claims, 5 Drawing Sheets

SYSTEM AND METHOD FOR CLOUD COMPUTING-BASED VEHICLE CONFIGURATION

CROSS-REFERENCE TO RELATED APPLICATIONS

This application claims the benefit of U.S. Provisional Application No. 63/015,547, having the title of "SYSTEM AND METHOD FOR CLOUD COMPUTING-BASED VEHICLE CONFIGURATION RECOMMENDATION" and the filing date of Apr. 25, 2020, which application is hereby incorporated herein by reference in its entirety.

BACKGROUND

In the vehicle industry, in particular the heavy-duty trucking industry, a vehicle may be customized based on customer requirements. Given the myriad of possible combinations of vehicle options available (e.g., engine, powertrain, rear-axle ratio, electric motors, fuel cells) and differing customer use cases (linehaul, pick-up and delivery, drayage, etc.), engineering teams are oftentimes faced with a challenge of choosing a best performing vehicle to simultaneously meet performance (e.g., gradeability, acceleration, trip time) and fuel economy/freight efficiency targets, while further complying with various regulatory requirements may be mandated with respect to minimum fuel economy and emissions.

Currently, attempts for determining a vehicle configuration may rely on either simple vehicle models or flow charts/rules, or that rely on complex simulations. Methods relating to simple vehicle models or flow charts/rules may not have sufficient richness to capture details at a drive cycle level and may require extensive refinement to address upcoming challenges of simultaneous reduction in NOx and $CO_2$ emissions. Methods relating to complex simulations may be enabled to capture effects of drive cycles; however, the tools to perform these simulations are expensive and may require a highly skilled user to run the simulations and draw meaningful conclusions. This can be cost-prohibitive for most fleets, let alone be profitable for a company to perform on a per truck basis. Further, these simulations typically require powerful computers that are difficult to maintain by the dealer. Other challenges include data security, cost-efficient storage, and data throughput and processing capability, which limit the ability to deploy this at the customer/dealer/sales level.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing an optimized vehicle configuration. Aspects of the vehicle configuration system utilize vehicle simulations, real-world telematics data, machine-learning, and cloud-computing to deploy a client application having sufficient complexity to draw conclusions based on variations in customer duty cycles using drive cycle level data. A high-fidelity simulation coupled with advanced machine learning may be leveraged to deploy a lightweight, easy to use cloud-based service, thereby offering vehicle optimization as a standard package for fleets of all sizes. Moreover, aspects of the present disclosure provide a scalable and consistent architecture that can utilize a same template for any new vehicle configuration that may be introduced, thereby reducing engineering effort.

In a first aspect, a system for providing an optimized vehicle configuration is provided. In an example embodiment, the system comprises at least one processor, a memory storage device including instructions that when executed by the at least one processor are configured to: receive a request for a vehicle configuration that optimizes a customer performance priority for a representative route; apply a predictive machine learning model configured to: determine key performance indicators associated with various vehicle configurations for the representative route; compare the key performance indicators associated with the various vehicle configurations; and determine, based on the customer performance priority, the vehicle configuration; and provide the vehicle configuration for display.

In another aspect, a system for providing an optimized vehicle configuration is provided. In an example embodiment, the system comprises at least one processor, a memory storage device including instructions that when executed by the at least one processor are configured to: obtain vehicle test data for various vehicle configurations exercised over a set of routes; calibrate a simulation model using the vehicle test data; obtain routes data including information associated with a plurality of routes; apply the calibrated simulation model over the plurality of routes; determine key performance indicators associated with various vehicle configurations for each of the plurality of routes; store simulation data including the determined key performance indicators in a simulations database; obtain real-world telematics data; and use the simulation data and real-world telematics data to train a predictive machine learning model, wherein the predictive machine learning model is configured to: determine key performance indicators associated with various vehicle configurations for a representative route; compare the key performance indicators associated with the various vehicle configurations; and determine, based on the customer performance priority, the vehicle configuration.

In another aspect, a method for providing an optimal vehicle configuration is provided, comprising: obtaining vehicle test data for various vehicle configurations exercised over a set of routes; calibrating a simulation model using the vehicle test data; obtaining routes data including information associated with a plurality of routes; applying the calibrated simulation model over the plurality of routes; determining key performance indicators associated with various vehicle configurations for each of the plurality of routes; storing simulation data including the determined key performance indicators in a simulations database; obtaining real-world telematics data; using the simulation data and real-world telematics data to train a predictive machine learning model to determine an optimal vehicle configuration; receiving a request for a vehicle configuration that optimizes a customer performance priority for a representative route; and applying the predictive machine learning model, comprising: determining key performance indicators associated with various vehicle configurations for the representative route; comparing the key performance indicators associated with the various vehicle configurations; determining, based on the customer performance priority, the vehicle configuration; and providing the vehicle configuration for display.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Aspects of the present disclosure are generally directed to systems and methods for configuring and optimizing a vehicle configuration to meet desired performance measurement criteria and regulatory requirements.

The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

Figure 1:
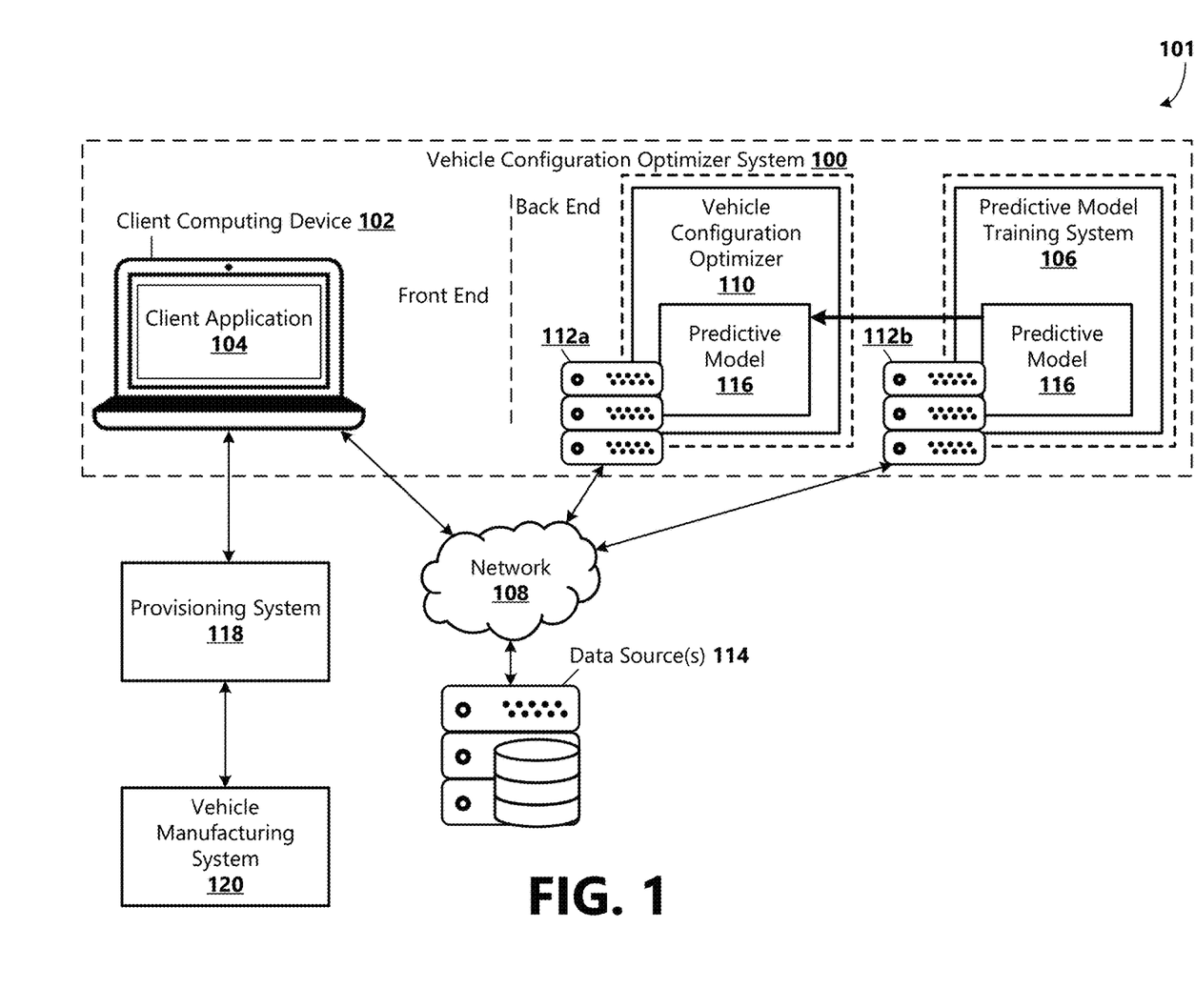
FIG. 1 is a block diagram of an example environment in which a system of the present disclosure can be implemented according to a first embodiment.

FIG. 1 is a block diagram of an example environment 101 in which a vehicle configuration system 100 of the present disclosure can be implemented. For example, the example environment 101 may include a client computing device 102, a network 108, a plurality of data sources 114, and one or more servers 112a,b (generally 112). Communications between the client computing device 102, the data sources 114, and the one or more of servers 112 are carried out over the network 108 using well-known network communication protocols. For example, the network 108 may be one or a wide area network (e.g., the Internet), a local area network, another type of network, or a combination thereof.

The client computing device 102 may be one or more of various types of computing devices (e.g., a server device, a desktop computer, a tablet computing device, a mobile device, a laptop computer, a laptop/tablet hybrid computing device, a large screen multi-touch display, or other type of computing device) configured to execute instructions for performing a variety of tasks. The hardware of these computing devices is discussed in greater detail in regard to FIG. 5. The client computing device 102 is shown to include a front end client application 104. A user may use the client application 104 to input customer information and/or obtain customer information from a data source 114, and to initiate a request for a vehicle configuration. For example, the user may be a customer (e.g., a buyer or potential buyer of a vehicle), a dealer of vehicles, etc., and the vehicle configuration system 100 may be used to provide a user-friendly front end client application 104 with which the user may interface, and a back end deep-learning machine learning model that is deployed on the cloud to determine an optimal vehicle configuration.

The client application 104 may be configured to provide requests (e.g., hypertext transfer protocol (HTTP) requests) to data sources 114 and servers 112 for requesting information stored on or accessible to, or determined by the data sources 114 and/or servers 112. In some examples, the client application 104 is a thick client application that is stored locally on the client computing device 102. In other examples, the client application 104 is a thin client application (e.g., a web application) that may reside on a remote server and be accessible over the network 108. For example, a thin client application can be hosted in a browser-controlled environment or coded in a browser-supported language and be reliant on a common web browser executing on the client computing device 102 to render the client application 104 executable on the device.

The data sources 114 may be or include any suitable data source or data storage server, unit or system, including any applicable applications, e.g., database management system (DBMS) applications, attached storage systems and the like. The data sources 114 are configured to execute instructions that provide information to the vehicle configuration system 100. For example, a data source 114 may receive a request for stored data from the client computing device 102 and from back end modules of the vehicle configuration system 100.

The server(s) 112 are illustrative of physical or virtual processing systems that are configured to execute instructions that analyze data and provide information to the client computing device 102 and in response to receiving requests from the client computing device 102. For example, the information may include Web pages, output of executables, raw data, or any other suitable type of information. In accordance with some example embodiments, the server(s) 112 are configured to host respective Web sites, so that the Web sites are accessible to users of the vehicle configuration system 100. The server(s) 112a are shown to include a backend vehicle configuration optimizer 110. The vehicle configuration optimizer 110 is illustrative of a software module, system, or device that is operative or configured to provide an optimal vehicle configuration for a vehicle that is customized to the customer (based on the customer information input by the user or obtained from a data source 114) using vehicle simulations, real-world telematics data, machine learning, and cloud computing. Example techniques for providing an optimal vehicle configuration using a predictive machine learning model 116 are discussed in greater detail below with reference to FIGS. 2 and 3.

In some examples, the example environment 101 may include a provisioning system 118 and a vehicle manufacturing system 120. For example, the provisioning system 118 is illustrative of a software module, system, or device that is operative or configured to receive an optimal vehicle configuration for a vehicle, as determined by the vehicle configuration optimizer system 100, and communicate with the vehicle manufacturing system 120 for initiating manufacture of the vehicle according to the optimal vehicle configuration. In some examples, the provisioning system 118 may be operative to convert vehicle configuration options corresponding to the optimal vehicle configuration (e.g., powertrain configurations, other vehicle configurations/options) into a format that can be utilized by the vehicle manufacturing system 120 to initiate manufacture of the vehicle.

The server(s) 112b are shown to include a back end predictive model training system 106. The vehicle configuration optimizer 110 and the predictive model training system 106 are shown to be included in separate servers (or respective groups of servers). In some examples, it will be recognized that the vehicle configuration optimizer 110 and the predictive model training system 106 (or any respective portions thereof) may be included in a common server 112 or a common group of servers. Aspects of the predictive model training system 106 are operative or configured to generate a database of training data that are used to train the vehicle configuration optimizer's predictive model 116 using deep-learning machine learning techniques. The predictive model training system 106 and example techniques for training the predictive machine learning model 116 are discussed in greater detail below with reference to FIGS. 2 and 4.

Figure 2:
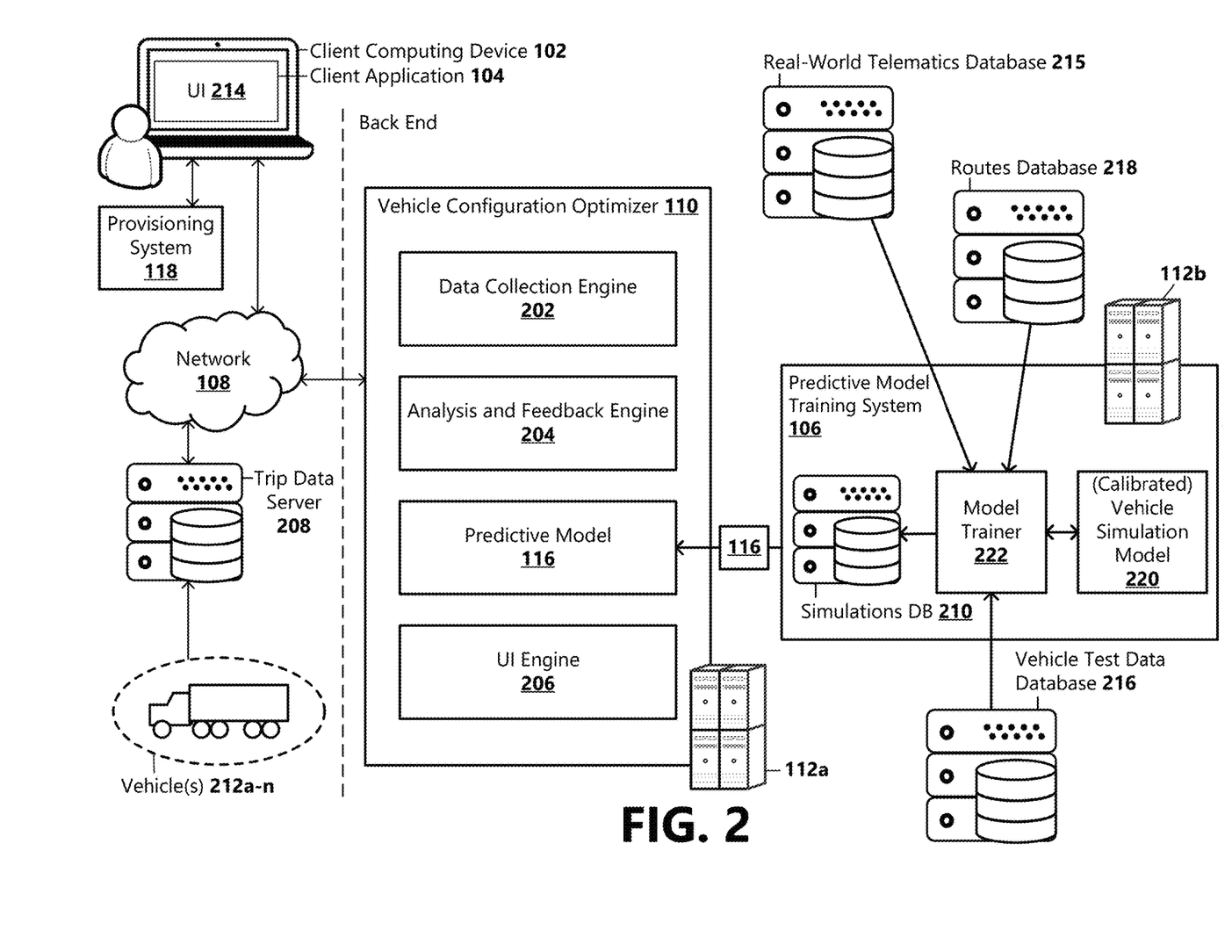
FIG. 2 is a block diagram illustrating components of the example system.

FIG. 2 is a block diagram that illustrates components of an example vehicle configuration system 100. A user may use the client application 104 to initiate a request for an optimal vehicle configuration from the vehicle configuration optimizer 110. According to examples, the client application 104 may provide a graphical user interface (GUI) 214 that allows the user to input vehicle configuration options, to view an optimal vehicle configuration, associated key performance indicators (KPIs) data, and other information, and to otherwise interact with functionalities of the vehicle configuration system 100 through manipulation of graphical icons, visual indicators, and the like. In some examples, the GUI 214 may include a webpage or an application interface visible to the user (e.g., the customer, a salesperson, and/or a dealer). For example, the GUI 214 may be displayed on a screen included in or operatively connected to the client computing device 102. In some examples, the GUI 214 may be configured to utilize natural interface technologies that enable a user to interact with functions of the vehicle configuration system 100 and data provided by the vehicle configuration system 100 in a "natural" manner (e.g., methods that may rely on speech recognition, touch and stylus recognition, gesture recognition both on screen and adjacent to the screen, air gestures, head and eye tracking, voice and speech, vision, touch, hover, gestures).

In some examples, such as if the customer is an existing customer, the client application 104 may be configured to request or otherwise obtain customer trip data stored on or accessible to a data source 114 embodied as a trip data server 208. In some examples, the client application 104 may request or otherwise obtain customer trip data over a time period (e.g., 1 year, 2 years). In some examples, the client application 104 may use an application programming interface (API) for retrieving trip data from the trip data server 208. The trip data server 208 may be configured to collect trip data from one or a population of the customer's vehicles 212a-n (generally 212). The collected trip data can include various duty cycle and drive cycle data associated with trips taken by the vehicles 212 including, GPS data, map data, and various telematics data (e.g., physical sensors data, vehicle engine data, diagnostics data). For example, the captured data can include data associated with the vehicle's location, speed, movement (e.g., trip length, trip duration, travel characteristics, altitude, grade, etc.) between an originating location and a destination location, idling time, harsh acceleration or braking, fuel consumption, vehicle faults, etc. In some examples, additional trip-related data may be included, such as load profile data and other data. The customer trip data may be collected using various technologies, such as via a dedicated onboard vehicle tracking device installed in a vehicle 212 that allows the sending, receiving and storing of telemetry data. In some examples, the device may be configured to connect via the vehicle's onboard diagnostics (ODBII), CAN (Controller Area Network) bus port, or other technology with a SIM card, and an onboard modem may enable communication through a wireless network 108. In some examples, the trip data may be transmitted via GPRS (General Packet Radio Service), a mobile data and cellular network, or satellite communication to the trip data server 208. In some examples, the trip data server 208 may be configured to process and convert the collected trip data into a database of trips for determining trip characteristics, such as routes taken in association with the trips and, in some examples, characteristics associated with the routes (e.g., altitude, temperature/climate, length, traffic/incidental idling time, average speed, maximum speed, a number of vehicle starts and stops).

In some examples, the client application 104 may receive a user input of trip data associated with a representative route via the GUI 214. The trip data input by the user may include an input of drive cycle data and an input of an originating location and a destination location associated with the representative route. In some examples, the customer may not be an existing customer, and the trip data input by the user in association with a representative route may correspond to a route the customer utilizes but for which the trip data server 208 may not have collected trip data stored. In other examples, the customer may be an existing customer, and the trip data input by the user in association with a new representative route may correspond to a route the customer may consider utilizing and for which the customer desires to receive an optimal vehicle configuration.

According to an aspect, the client application 104 is further configured to receive additional customer information including a selection of one or more customer performance priorities corresponding to the customer's desired goals associated with an optimal vehicle configuration. For example, "optimal" may be defined by the customer's performance priorities, wherein the optimal vehicle configuration may describe a vehicle configuration with associated KPIs that maximize the customer's performance priorities (e.g., fuel economy, gradeability, acceleration, freight efficiency) while additionally complying with regulatory emissions requirements (e.g., carbon dioxide, nitrogen oxide, and other greenhouse gasses) and size, weight, and other equipment regulations. In some examples, the user may be enabled to indicate priority levels and/or minimum acceptable values associated with various customer performance priorities. For example, the user may be enabled to select various customer performance priorities and may be further enabled to indicate a priority ranking for each performance priority. As another example, the user may be enabled to select a customer performance priority (e.g., fuel economy) and a minimal acceptable value associated with the performance priority (e.g., a minimal acceptable average miles/gallon value).

In some examples, the client application 104 may be configured to receive additional customer information from the user via the GUI 214, such as a selection of vehicle specification options (e.g., engine, transmission, axle ratio), information on expected use of the vehicle, commercial application information, and driver profile or driving style. According to an aspect, the client application 104 is operative or configured to provide the received/obtained customer information (e.g., trip data, representative route data, customer performance priorities, additional customer information) to the vehicle configuration optimizer 110 as part of a request for an optimal vehicle configuration based on the customer data.

According to an aspect and with reference still to FIG. 2, the vehicle configuration optimizer 110 may include various components including a data collection engine 202, an analysis and feedback engine 204, a predictive model 116, and a UI engine 206. As should be appreciated, while the various components are shown to be included in a common server 112a (or a common group of servers), the various components (or any respective combinations or portions thereof) may be included in separate servers (or respective groups of servers). The data collection engine 202 is illustrative of a software module, system, or device that is operative or configured to receive the request and associated customer information (e.g., trip data, representative route data, customer performance priorities, additional customer information) transmitted from the client computing device 102, and to process selections made by the user.

The analysis and feedback engine 204 is illustrative of a software module, system, or device that is operative or configured to analyze (e.g., perform calculations on) customer information received from the data collection engine 202 and provide feedback related to a determined optimal vehicle configuration. In some examples, such as if the user has not specified a representative route, the analysis and feedback engine 204 is configured to analyze received trip data (e.g., obtained from the trip data server 208) and determine one or more representative routes. In some examples, the one or more representative routes include routes most frequently taken based on the received trip data.

According to an aspect, the analysis and feedback engine 204 is further configured to use the predictive model 116 to determine an optimal vehicle configuration for the one or more representative routes having estimated KPIs that maximize the customer's performance priorities (e.g., fuel economy, gradeability, acceleration, freight efficiency) while additionally complying with regulatory requirements. For example, the predictive model 116 may be configured to learn correlations between characteristics of various routes and KPIs for various vehicle configurations. As part of determining an optimal vehicle configuration, the predictive model 116 may be further configured to determine, via intelligent interpolation, KPIs (e.g., fuel economy, gradeability, acceleration, freight efficiency) for various vehicle configurations based on one or more representative routes selected by or determined for the customer, and to determine, based on the interpolated KPIs, an optimal vehicle configuration that maximizes the customer's performance priorities (which may include costs) and complies with regulatory requirements.

A vehicle configuration may include a selection of vehicle specification options corresponding to various vehicle options available to a customer (e.g., powertrain configurations, electric motors, fuel cells, other vehicle configurations). For example, an engine type may define an engine family and an engine power setting; a transmission type may define a hardware configuration and software configuration of the transmission; and an axle ratio may define a drive-axle ratio that represents the relationship between driveshaft revolutions (driven by the transmission) and drive-axle revolutions. In some examples, alternative and/or additional combinations of vehicle configuration options may be determined. In examples, the vehicle configuration may comprise a configuration of powertrain options, e.g., an engine type, a transmission type, and an axle ratio; however, other vehicle options may be included in the vehicle configuration.

According to an aspect, the predictive model 116 may be implemented using a deep-learning machine learning model that has the complexity to capture the richness of drive-cycle level data, while still being wieldy to deploy on a cloud server 122 without extensive resources. In some examples, the predictive model 116 comprises mathematical parameters that can be stored as a sparse matrix, thus advantageously mitigating data storage issues. Moreover, the predictive model 116 is deployed on a cloud server 112a, which allows for the model to be easily maintained and used by a non-technical audience (e.g., a customer, a salesperson, a dealer), which advantageously increases the utility of the vehicle configuration system 100. Example techniques for training the predictive machine learning model 116 are discussed in greater detail below.

The UI engine 206 is illustrative of a software module, system, or device that is operative or configured to provide a GUI 214 to be rendered by the client computing device 102 to allow the user to provide customer data and to receive feedback on an optimal vehicle configuration for the one or more representative routes and associated estimated KPIs. In some examples, the feedback may further include indicators of whether, or to what extent, the customer performance priorities are optimized.

In some examples, the client application 104 is further configured to receive or obtain the customer's current vehicle configuration and associated KPIs. For example, if the customer is an existing customer, information associated with the customer's current vehicle configuration may be obtained from the trip data server 208 or a remote diagnostics data source 114. If the customer is not an existing customer, the customer's current vehicle configuration may be input or selected by the user using the GUI 214. The customer's current vehicle configuration information may be provided to the vehicle configuration optimizer 110 as part of the request for an optimal vehicle configuration. In some examples, such as if KPIs associated with the customer's current vehicle configuration are not known, the analysis and feedback engine 204 may be further configured to use the predictive model 116 to intelligently interpolate KPIs for the customer's current vehicle configuration based on the one or more representative routes selected by or determined for the customer. In some examples, the analysis and feedback engine 204 may be further configured to compare the (obtained or interpolated) KPIs associated with the customer's current vehicle configuration against the interpolated KPIs associated with the determined optimal vehicle configuration. The UI engine 206 may be further configured to provide the compared KPIs in the GUI 214 for display to the user. For example, the user/customer can view the compared KPIs for identifying potential improvements in KPIs that the customer may realize if the optimal vehicle configuration is used to run the representative route.

According to an aspect, the predictive model training system 106 includes various components that are used to train the predictive model 116. As illustrated in FIG. 2, the predictive model training system 106 includes a vehicle simulation model 220 and a simulations database 210. The vehicle simulation model 220 includes a vehicle model that is calibrated using vehicle test data. The vehicle test data may be obtained from a data source 114 embodied as a vehicle test data database 216. For example, the vehicle test data stored in the vehicle test data database 216 may include test results data (e.g., vehicle test lab results) acquired from various vehicle tests exercised over a selection of drive cycles (e.g., speeds, loads, grades, lengths, setting) to obtain KPIs relating to various combinations of vehicle technologies that can be implemented in a vehicle configuration. The various vehicle technologies correspond to various vehicle specification options (e.g., engine type, a hardware/software transmission type, and an axle ratio) included in a vehicle configuration. In some examples, the vehicle tests are configured to test various combinations of various vehicle specification options and various drive cycles along a limited set of routes, wherein the limited set of routes represent different route types/categories (e.g., urban, rural, highway, mountain, geographical regions) having particular route characteristics (e.g., stop-and-go cycles, steady-state cruise cycles, various grades, various altitudes, temperatures). According to an aspect, the vehicle test data may represent a subset of real world test data comprising test result KPIs, and are used to tune an initial vehicle simulation model, thus resulting in a calibrated vehicle simulation model 220 that is validated against real world test data. For example, the vehicle simulation model 220 may operate as a digital vehicle representative of each possible vehicle configuration of an actual vehicle 212 that a vehicle dealer may offer or that an original equipment manufacturer (OEM) may be configured to manufacture.

According to an aspect, the vehicle simulation model 220 is trained using routes data. The routes data may be obtained from a data source 114 embodied as a routes database 218. One example routes database 218 is HERE MAP CONTENT (NAVMART of Greenwood Village, CO). For example, the routes database 218 may include a geographic reference system including geographic information system (GIS) maps and associated data for a geographic area (e.g., state, country, continent). Associated data can include information about navigable attributes of geolocations included in the maps including information such as geo-coordinates, altitudes, traffic patterns (e.g., typical speeds and travel times), points of interest, address ranges, turn restriction information, road network connectivity information, Z-axis height data for tunnels and bridges, exit and entrance ramp information, historical traffic speeds, etc.

According to an aspect, the model trainer 222 may be configured to provide an originating location and a destination location to the routes database 218 as part of a request for a route and associated route data. The request may include one or a plurality of originating/destination location sets. In some examples, the originating/destination location sets may be associated with known Class A truck routes, and in further examples, known truck routes of customers. In response to the request, a route is determined and the route and associated route data are provided to the model trainer 222. In some examples, the route may be determined based on a route suitable for a Class A truck based on attributes of the route. In some examples, the route may be determined based on known Class A truck routes.

According to an aspect, the model trainer 222 may be configured to apply the vehicle simulation model 220 on each route requested and received from the routes database 218. The route and associated route data may operate as a digital route on which a digital vehicle, embodied as the vehicle simulation model 220, may run. The model trainer 222 may be configured to run a simulation of each digital vehicle configuration (e.g., of an actual vehicle 212 that an OEM or dealer may offer) on each digital route and determine KPIs for each simulated route/vehicle configuration combination. According to an aspect, simulation data comprising the simulation parameters (e.g., the route, attributes of the route, drive cycle data, and the vehicle configuration) and the simulation results (e.g., determined KPIs) of each simulation are stored in the simulations database 210.

According to an aspect, the model trainer 222 may be further configured to train the predictive model 116 for optimizing a vehicle configuration against route information and drive cycle data. For example, the predictive model 116 may be trained to receive a route, drive cycle data, and customer performance priority selections as inputs, and based on simulation data stored in the simulations database 210 and additionally, in some examples, real-world telematics data, determine or intelligently interpolate KPIs for the route for the various combinations of vehicle configurations. The predictive model 116 may be further trained to compare the KPIs for each vehicle configuration and, based on the customer's priority selections and regulatory requirements, determine an optimal vehicle configuration for the route.

In some examples, in addition to the simulation data stored in the simulations database 210, the predictive model 116 may be further configured to be trained on real-world telematics data stored in a real-world telematics database 215. For example, the model trainer 222 may be configured to obtain and combine simulation data and real-world telematics data to train the predictive model 116 to determine or intelligently interpolate KPIs for a route for various combinations of vehicle configurations. In some examples, the model trainer 222 may use an API for retrieving real-world telematics data from the real-world telematics database 215. The real-world telematics database 215 may be configured to collect real-world telematics data and, in some examples, additional trip data, from a population of customers' vehicles 212. According to an example, real-world telematics data may include trip data that may be obtained from one or more trip data servers 208. For example, a particular vehicle manufacturer may aggregate data from multiple trip data servers 208 that contain trip data for many customers of the vehicle manufacturer. In this manner, the real-world telematics database 215 may comprise a robust set of trip data across a variety of customers having widely different routes, vehicles, and typical drive cycles. The trip data can, in examples, also be normalized into a consistent array of data for input into the model trainer 222 to permit model trainer 222 to use AI/ML techniques to produce the vehicle simulation model 220.

The collected real-world telematics data can include various duty cycle and drive cycle data associated with trips taken by the vehicles 212 including, GPS data, map data, and various telematics data (e.g., sensors data, vehicle engine data, diagnostics data). For example, the captured data can include data associated with the vehicles' location, speed, movement (e.g., trip length, trip duration, travel characteristics, altitude, grade, etc.) between an originating location and a destination location, idling time, harsh acceleration or braking, fuel consumption, vehicle faults, etc. In some examples, additional real-world telematics and/or trip-related data may be included, such as load profile data and other data. The real-world telematics data may be collected using various technologies, such as via a dedicated onboard vehicle tracking device installed in a vehicle 212 that allows the sending, receiving and storing of telemetry data. In some examples, the device may be configured to connect via the vehicle's onboard diagnostics (ODBII), CAN (Controller Area Network) bus port, or other technology with a SIM card, and an onboard modem may enable communication through a wireless network 108. In some examples, the real-world telematics data may be transmitted via GPRS (General Packet Radio Service), a mobile data and cellular network, or satellite communication to the real-world telematics database 215. In some examples, the real-world telematics database 215 may be configured to process and convert the collected trip data into a database of trips for determining trip characteristics, such as routes taken in association with the trips and, in some examples, characteristics associated with the routes (e.g., altitude, temperature/climate, length, traffic/incidental idling time, average speed, maximum speed, a number of vehicle starts and stops). In some examples, the real-world telematics database 215 may be further configured to anonymize the real-world telematics data.

According to an aspect, running computationally expensive simulations and training the deep machine learning predictive model 116 in the predictive model training system 106 is advantageous in that the majority of the computational effort (e.g., calibrating the simulation model 204 and running the simulation model for a range of vehicle configurations and for various known routes for building the simulations database 210) is performed beforehand in the predictive model training system 106, thereby reducing the dimensional complexity associated with determining an optimal vehicle configuration and associated PKIs based on a representative route.

In examples, a version of the predictive model 116 may be stored in the vehicle configuration optimizer system 110 (e.g., in a cloud storage environment that is accessible to client computing device 102). That predictive model 116 is scalable and may be periodically updated by the predictive model training system 106. For example, the predictive model training system 106 may be instantiated on computing systems of a vehicle manufacturer, as the simulations database 210 may be very large depending on the complexity of routes and vehicle configurations that are simulated. As such, the predictive model 116 may be continuously or periodically updated within the predictive model training system 106 and then periodically updated within cloud storage for the vehicle configuration optimizer system 110. In that manner, the comparatively lightweight predictive model 116 can be stored in cloud storage, while the more resource/storage-intensive predictive model training system 106 (including the simulations database 210) is maintained at a separate site (such as a vehicle manufacturer's facility).

Figure 3:
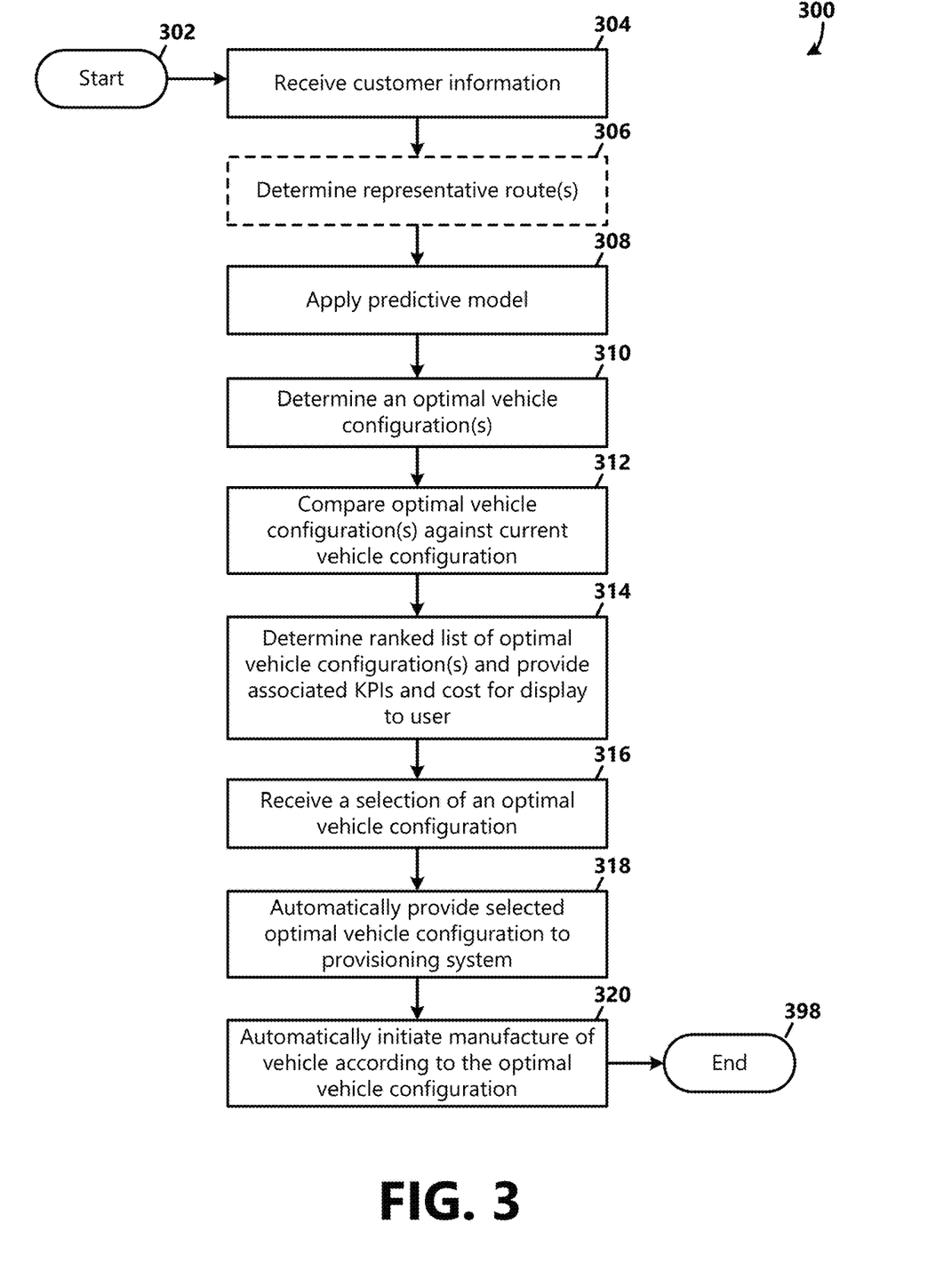
FIG. 3 is a flow diagram depicting general stages of an example process for providing an optimal vehicle configuration.

FIG. 3 is a flow diagram depicting general stages of an example method 300 for providing an optimal vehicle configuration. The method 300 starts at OPERATION 302 and proceeds to OPERATION 304, where customer information is received, such as using the front end client application 104 as part of a request for an optimal vehicle configuration. For example, a user may use the client application 104 to receive a vehicle configuration for a vehicle that is optimized to maximize the customer's performance priorities (e.g., fuel economy, gradeability, acceleration, trip time, freight efficiency) while additionally complying with regulatory emissions requirements (e.g., carbon dioxide, nitrogen oxide, and other greenhouse gasses) and size, weight, and other equipment regulations. At least a portion of the customer information may be input by a user using the GUI 214. For example, the user may input or select the customer's performance priorities. In some examples, such as if the customer is not an existing customer, an originating/destination location data set that defines a representative route for the customer and drive cycle data (e.g., speeds, loads, grades, lengths, setting) may be received by the client application 104. In other examples, such as if the customer is an existing customer, trip data may be obtained from the trip data server 208. In some examples, the customer's current vehicle configuration(s) may additionally be obtained from the trip data server 208 or received via user input. The customer's performance priorities, the customer's trip data or representative route data, and the customer's current vehicle configuration data may be sent by the client application 104 to the vehicle configuration optimizer 110.

At OPTIONAL OPERATION 306, a representative route including an originating location and a destination location associated with the representative route may be determined using the customer's trip data. For example, if the customer is an existing customer, the customer's trip data may be analyzed to determine a representative route corresponding to expected vehicle use (e.g., location and drive cycle). In examples, the representative route may comprise multiple routes.

At OPERATION 308, a predictive model (such as predictive model 116) may be applied to the representative route(s). For example, applying 308 the predictive model 116 may allow the vehicle configuration optimizer system 100 to determine or intelligently interpolate KPIs for the representative route(s) for various combinations of vehicle configurations. The predictive model 116 may further be used to compare the KPIs for each vehicle configuration combination, and based on the customer's priority selections and regulatory requirements, at OPERATION 310, determine one or more optimal vehicle configuration(s) for the route(s) that maximizes the customer's performance priorities while additionally complying with regulatory emissions requirements.

At OPERATION 312, the determined optimal vehicle configuration(s) may be compared against the customer's current vehicle configuration KPIs for identifying potential improvements in KPIs that the customer may realize if the optimal vehicle configuration(s) is/are used to run the representative route(s).

At OPERATION 314, the optimal vehicle configuration(s) may be provided, and the optimal vehicle configuration and associated KPIs and comparison data may be provided to the client application 104 for display to the user via the GUI 214. In some examples, additional data may be determined and provided for display to the customer, such as an indication of whether, or to what extent, the customer performance priorities are optimized and the cost of the configuration(s). For example, the customer may use the vehicle configuration for selection of a vehicle to purchase. In examples, the optimal vehicle configuration may include one configuration or it may include an ordered or ranked list of potential configurations. For example, the ranked list of potential configurations may be provided to the client application 104, where it may be re-ranked or otherwise manipulated based on a variety of factors, including particular KPIs, customer performance priorities, and/or cost.

At OPERATION 316, an optimal vehicle configuration may be selected. In some examples, when a plurality of optimal vehicle configurations is determined and provided, the client application 104 may receive a selection of an option provided by the client application 104 for a preferred optimal vehicle configuration. In other examples, the optimal vehicle configuration may be automatically selected. For example, if one optimal vehicle configuration is determined and provided, the one optimal vehicle configuration may be selected. In another example, if a plurality of optimal vehicle configurations are provided in a ranked list, the client application 104 may select a top-ranking vehicle configuration as the optimal vehicle configuration.

At OPERATION 318, the selected optimal vehicle configuration may be automatically provided to the provisioning system 118, and at OPERATION 320, the manufacture of a vehicle 212 may be automatically initiated according to the optimal vehicle configuration. For example, the vehicle manufacturing system 120 may use the optimal vehicle configuration to manufacture a vehicle 212 that maximizes the customer's performance priorities while additionally complying with regulatory emissions requirements, size, weight, and other equipment regulations. In examples, the manufacture of the vehicle 212 may be fully automated based on the selected optimal vehicle configuration. The method 300 ends at OPERATION 398.

Figure 4:
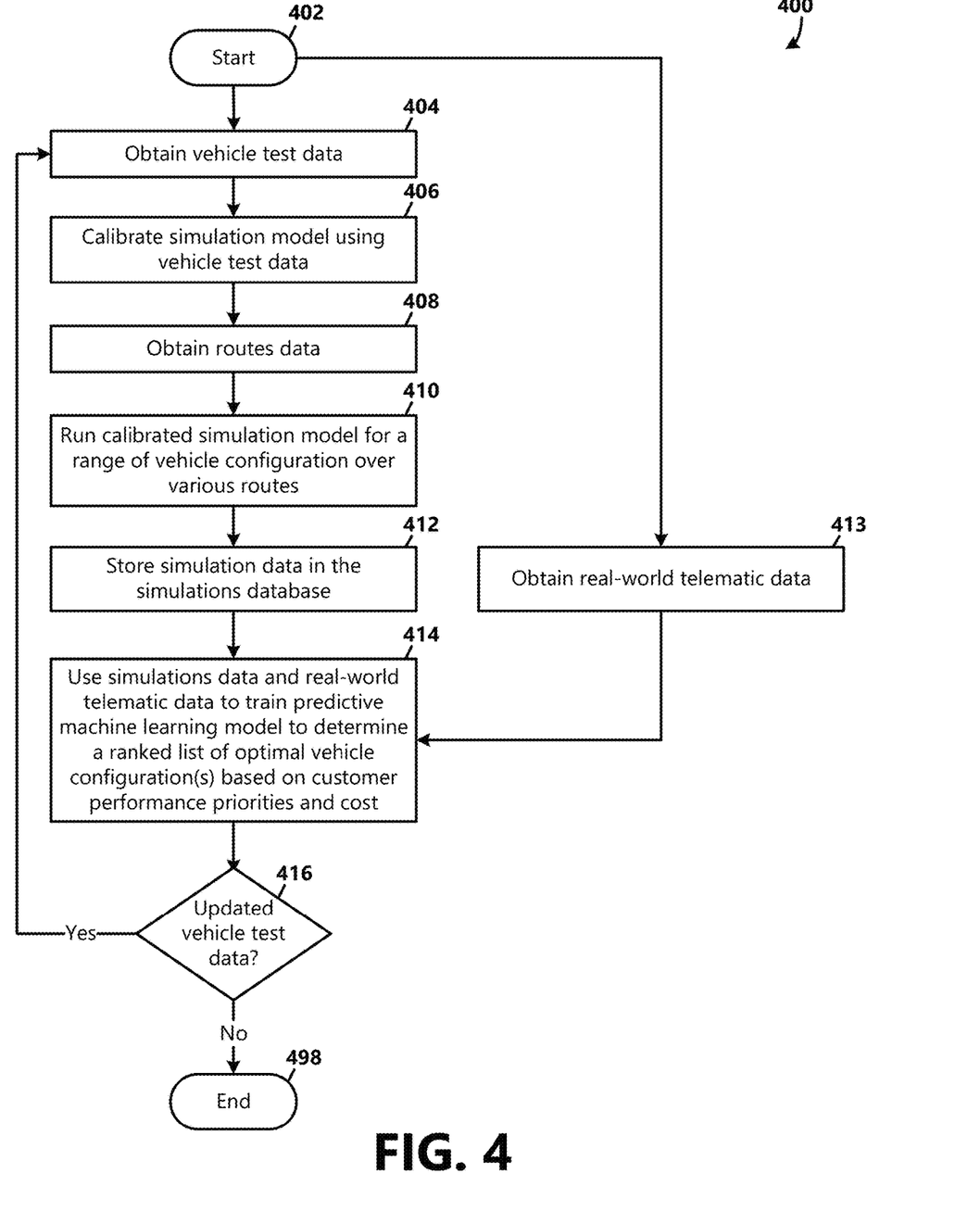
FIG. 4 is a flow diagram depicting general stages of an example process for training a predictive machine learning model configured to provide an optimal vehicle configuration.

FIG. 4 is a flow diagram depicting general stages of an example method 400 for training a predictive machine learning model configured to determine or intelligently interpolate key performance indicators (KPIs) for one or more route(s) for various combinations of vehicle configurations, compare the KPIs for each vehicle configuration combination, and determine one or more optimal vehicle configuration(s) for the route(s) that maximizes the customer's performance priorities while additionally complying with regulatory emissions requirements. With reference now to FIG. 4, the method 400 starts at OPERATION 402 and proceeds to OPERATION 404, where vehicle test data may be obtained from the vehicle test data database 216. As described above, the vehicle test data may include vehicle test lab results acquired from various vehicle tests exercised over a selection of drive cycles (e.g., speeds, loads, grades, lengths, setting) and over a limited set of routes. The vehicle test data may include KPIs relating to various types/categories of routes (e.g., urban, rural, highway, mountain, geographical regions) and various combinations of vehicle technologies corresponding to various vehicle specification options (e.g., engine type, a hardware/software transmission type, and an axle ratio) that can be implemented in a vehicle configuration.

At OPERATION 406, an initial vehicle simulation model may be checked/tuned against the obtained vehicle test data, and a calibrated vehicle simulation model 220 may be created. For example, the vehicle simulation model 220 may be validated against real world test data, and enables the vehicle simulation model 220 to operate as a digital vehicle representative of each possible vehicle configuration of an actual vehicle 212 that may be available to the customer.

At OPERATION 408, routes data may be obtained from the routes database 218. For example, the model trainer 222 may request a route and associated route data comprising route attributes from the routes database 218 based on one or more sets of originating and destination locations. In some examples, the one or more sets of originating and destination locations are associated with known Class A truck routes.

At OPERATION 410, the vehicle simulation model 220 may be applied on each route requested and received from the routes database 218. For example, the route and associated route data may operate as a digital route on which the vehicle simulation model 220 may run a plurality of simulations, wherein the plurality of simulations correspond to each vehicle configuration that a vehicle OEM or dealer may offer for sale. Results of the simulations (e.g., determined KPIs) may be determined, and at OPERATION 412, the results and the simulation parameters (e.g., the route(s), attributes of the route(s), drive cycle data, and the vehicle configuration) may be stored in the simulations database 210.

At OPERATION 413, real-world telematics data may be obtained from the real-world telematics database 215, and at OPERATION 414, the predictive machine learning model 116 may be trained using the obtained real-world telematics data and the simulation data stored in the simulations database 210. For example, using neural networks or other machine learning techniques, the predictive model 116 may be trained to receive a route(s), drive cycle data, and customer performance priority selections as inputs, and based on simulation data stored in the simulations database 210 and real-world telematics data, determine or intelligently interpolate KPIs for a route(s) for the various combinations of vehicle configurations, compare the KPIs for each vehicle configuration, and based on the customer's priority selections and regulatory requirements, determine an optimal vehicle configuration for the route.

In examples, a version of the predictive model 116 may be stored in the vehicle configuration optimizer system 110 (e.g., in a cloud storage environment that is accessible to client computing device 102). That predictive model 116 may be periodically updated by the predictive model training system 106. For example, the predictive model training system 106 may be instantiated on computing systems of a vehicle manufacturer, as the simulations database 210 may be very large depending on the complexity of routes and vehicle configurations that are simulated. As such, the predictive model 116 may be continuously or periodically updated within the predictive model training system 106 and then periodically updated within cloud storage for the vehicle configuration optimizer system 110. In that manner, the comparatively lightweight predictive model 116 can be stored in cloud storage while the more resource/storage-intensive predictive model training system 106 (including the simulations database 210) is maintained at a separate site (such as a vehicle manufacturer's facility).

At DECISION OPERATION 416, a determination may be made as to whether updated vehicle test data are available. For example, new technologies may be developed, and additional vehicle tests may be conducted for determining KPIs associated with the new technologies implemented along a limited set of routes representing different route types/categories. If this is the case and the additional vehicle test results are stored in the vehicle test database 216, the method 400 may return to OPERATION 404, where the additional vehicle test results may be obtained from the vehicle test database 216 so that the results can be used to further calibrate the vehicle simulation model 220. If updated vehicle test data are not available, the method 400 may end at END OPERATION 498.

In examples, the systems and methods described in this application produce multiple technical improvements. For example, the identification, collection, aggregation, normalization, and processing of potentially massive amounts of trip data, routes data, vehicle test data, and simulations data to generate a vehicle simulation model 220 saves computing resources by allowing provision of a relatively lightweight predictive model 116 to vehicle configuration optimizer 110. The lightweight predictive model 116, as part of the vehicle configuration optimizer 110 can then be hosted as a service on relatively light computing resources. Moreover, aggregation and normalization of trip data and telematics data from hardware sensors and other physical components of the vehicles transforms the data into usable information for optimizing configurations of other vehicles. In examples, when the optimized configuration is used to provision and manufacture a vehicle with optimized characteristics, such as fuel efficiency, natural resources are saved by ensuring that vehicles optimized for intended use are produced.

Unless otherwise specified in the context of specific examples, described techniques and tools may be implemented by any suitable computing device or set of devices. In any of the described examples, a data store may be used to store and manage data. A data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location.

Figure 5:
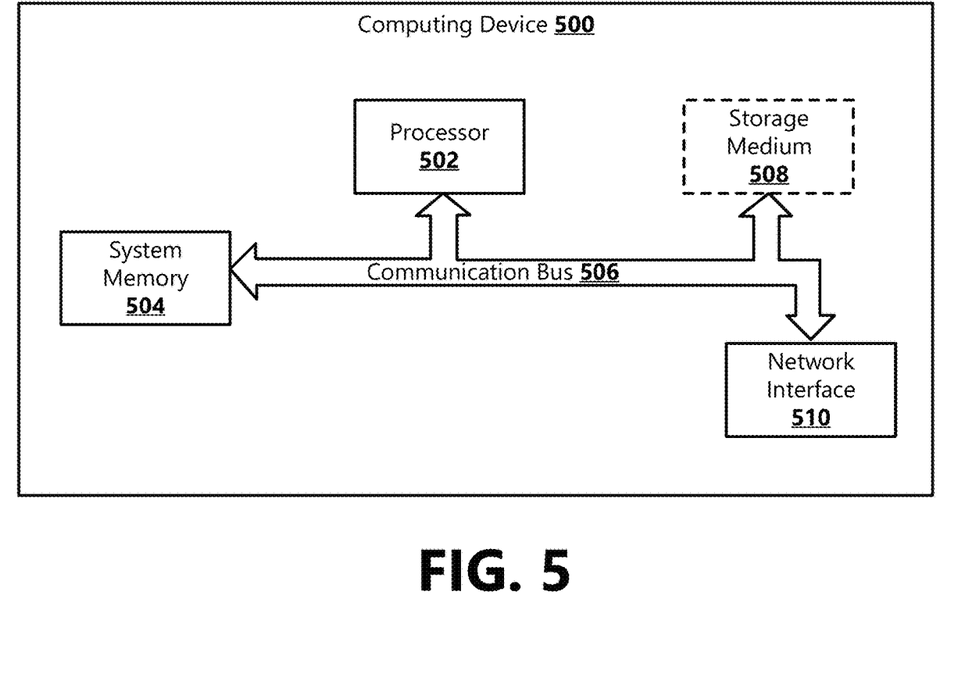
FIG. 5 is a block diagram illustrating example physical components of a computing device or system with which embodiments may be practiced.

FIG. 5 is a block diagram of an illustrative computing device 500 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 500 includes at least one processor 502 and a system memory 504 connected by a communication bus 506. Depending on the exact configuration and type of device, the system memory 504 may be volatile or nonvolatile memory, such as read-only memory ("ROM"), random access memory ("RAM"), EEPROM, flash memory, or other memory technology. Those of ordinary skill in the art and others will recognize that system memory 504 typically stores data or program modules that are immediately accessible to or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, 4G, LTE, Wi MAX, Bluetooth, or the like.

In the illustrative embodiment depicted in FIG. 5, the computing device 500 also includes a storage medium 508. However, services may be accessed using a computing device that does not include means for persisting data to a local storage medium. Therefore, the storage medium 508 depicted in FIG. 5 is optional. In any event, the storage medium 508 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 504 and storage medium 508 depicted in FIG. 5 are examples of computer-readable media.

For ease of illustration and because it is not important for an understanding of the claimed subject matter, FIG. 5 does not show some of the typical components of many computing devices. In this regard, the computing device 500 may include input devices, such as a keyboard, keypad, mouse, trackball, microphone, video camera, touchpad, touchscreen, electronic pen, stylus, or the like. Such input devices may be coupled to the computing device 500 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 500 (e.g., a client device), or can be integral components of the computing device 500. In some embodiments, multiple input devices may be combined into a single, multifunction input device (e.g., a video camera with an integrated microphone). The computing device 500 may also include output devices such as a display, speakers, printer, etc. The output devices may include video output devices such as a display or touchscreen. The output devices also may include audio output devices such as external speakers or earphones. The output devices can be separate from and communicatively coupled to the computing device 500, or can be integral components of the computing device 500. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft.NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A system for providing an optimal vehicle configuration, the system comprising:
   at least one processor;
   a memory storage device including instructions that when executed by the at least one processor are configured to:
   receive a request for a vehicle configuration that optimizes a customer performance priority for a representative route having an originating location and a destination location, wherein the customer performance priority includes a performance priority selected from: fuel economy, gradeability, acceleration, and freight efficiency;
   apply a predictive machine learning model configured to:
   determine key performance indicators associated with various vehicle configurations for the representative route;
   compare the key performance indicators associated with the various vehicle configurations;
   determine, based on the customer performance priority, the vehicle configuration; and
   provide the vehicle configuration for display.

2. The system of claim 1, wherein the system is further configured to train the predictive machine learning model, wherein in training the predictive machine learning model, the system is configured to:
   obtain vehicle test data for various vehicle configurations exercised over a set of routes;
   calibrate a simulation model using the vehicle test data;
   obtain routes data including information associated with a plurality of routes;
   apply the calibrated simulation model over the plurality of routes;
   determine key performance indicators associated with various vehicle configurations for each of the plurality of routes;
   store simulation data including the determined key performance indicators in a simulations database; and use the simulation data to train the predictive machine learning model.

3. The system of claim 2, wherein the simulation data further include, for each simulation of the various vehicle configurations run over the plurality of routes:
the route;
drive cycle data; and
the vehicle configuration.

4. The system of claim 2, wherein in training the predictive machine learning model, the system is further configured to:
obtain real-world telematics data; and
use the real-world telematics data in addition to the simulation data to train the predictive machine learning model.

5. The system of claim 4, wherein the real-world telematics data include duty cycle and drive cycle data associated with trips taken by a population of vehicles over the plurality of routes.

6. The system of claim 2, wherein the system is further configured to:
obtain vehicle test data for a new vehicle configuration exercised over a set of routes;
recalibrate the simulation model using the vehicle test data;
obtain route data including information associated with a second plurality of routes;
run the recalibrated simulation model over the second plurality of routes;
determine key performance indicators associated with the new vehicle configuration for each of the second plurality of routes;
store updated simulation data including the determined key performance indicators associated with the new vehicle configuration in the simulations database; and
use the updated simulation data to retrain the predictive machine learning model to determine a second vehicle configuration.

7. The system of claim 1, wherein determining the vehicle configuration optimizes the customer performance priority and complies with:
regulatory emissions requirements; and
size, weight, and equipment regulations.

8. A system for providing an optimal vehicle configuration, the system comprising:
at least one processor;
a memory storage device including instructions that when executed by the at least one processor are configured to:
obtain vehicle test data for various vehicle configurations exercised over a set of routes;
calibrate a simulation model using the vehicle test data;
obtain routes data including information associated with a plurality of routes;
apply the calibrated simulation model over the plurality of routes;
determine key performance indicators associated with various vehicle configurations for each of the plurality of routes;
store simulation data including the determined key performance indicators in a simulations database;
obtain real-world telematics data; and
use the simulation data and real-world telematics data to train a predictive machine learning model to determine a vehicle configuration;
wherein the system is further configured to:
receive a request for the vehicle configuration, wherein the request indicates a configuration that optimizes a customer performance priority for a representative route having an originating location and a destination location, wherein the customer performance priority includes a performance priority selected from: fuel economy, gradeability, acceleration, and freight efficiency;
apply the predictive machine learning model to determine the vehicle configuration;
provide the vehicle configuration for display;
receive a selection of the vehicle configuration; and
automatically provide the selected vehicle configuration to a provisioning system to initiate manufacture of a vehicle based on the vehicle configuration.

9. The system of claim 8, wherein the predictive machine learning model is configured to:
determine key performance indicators associated with various vehicle configurations for the representative route;
compare the key performance indicators associated with the various vehicle configurations; and
determine, based on the customer performance priority, the vehicle configuration.

10. The system of claim 8, wherein the representative route comprises an originating location and a destination location of one of:
a route for which trip data are stored; or
a route corresponding to an expected vehicle use.

11. The system of claim 8, wherein in determining the vehicle configuration, the system is configured to determine the configuration that optimizes the customer performance priority and complies with:
regulatory emissions requirements; and
size, weight, and equipment regulations.

12. The system of claim 8, wherein the system is further configured to:
obtain vehicle test data for a new vehicle configuration exercised over a set of routes;
recalibrate the simulation model using the vehicle test data;
obtain routes data including information associated with a second plurality of routes;
apply the recalibrated simulation model over the second plurality of routes;
determine key performance indicators associated with the new vehicle configuration for each of the second plurality of routes;
store updated simulation data including the determined key performance indicators in the simulations database; and
use the updated simulation data to retrain the predictive machine learning model to determine a second vehicle configuration.

13. The system of claim 8, wherein the routes data comprise:
geographic information system maps for geolocations associated with the originating locations and the destination locations; and
navigable attributes of the geolocations.

14. The system of claim 8, wherein the simulation data further include, for each simulation of the various vehicle configurations exercised over the set of routes:
the route;
drive cycle data; and
the vehicle configuration.

15. The system of claim 8, wherein the real-world telematics data include duty cycle and drive cycle data associated with trips taken by a population of vehicles over a plurality of routes.

16. A method for providing an optimal vehicle configuration, comprising:
    obtaining vehicle test data for various vehicle configurations exercised over a set of routes;
    calibrating a simulation model using the vehicle test data;
    obtaining route data including information associated with a plurality of routes;
    running the calibrated simulation model over the plurality of routes;
    determining key performance indicators associated with various vehicle configurations for each of the plurality of routes;
    storing simulation data including the determined key performance indicators in a simulations database;
    obtaining real-world telematics data;
    using the simulation data and real-world telematics data to train a predictive machine learning model to determine a vehicle configuration;
    receiving a request for a vehicle configuration that optimizes a customer performance priority for a representative route; and
    applying the predictive machine learning model, comprising:
        determining key performance indicators of vehicle operational performance associated with various vehicle configurations for the representative route;
        comparing the key performance indicators associated with the various vehicle configurations for the representative route;
        determining, based on the customer performance priority, the vehicle configuration, wherein the customer performance priority includes a performance priority selected from: fuel economy, gradeability, acceleration, and freight efficiency; and
    providing the vehicle configuration for display.

17. The method of claim 16, further comprising:
    obtaining vehicle test data for a new vehicle configuration exercised over a set of routes;
    recalibrating the simulation model using the vehicle test data;
    obtaining route data including information associated with a second plurality of routes;
    running the recalibrated simulation model over the second plurality of routes;
    determining key performance indicators associated with the new vehicle configuration for each of the second plurality of routes;
    storing updated simulation data including the determined key performance indicators associated with the new vehicle configuration in the simulations database; and
    using the updated simulation data to retrain the predictive machine learning model to determine a second vehicle configuration.

* * * * *